(12) United States Patent
Kurita et al.

(10) Patent No.: US 11,245,587 B2
(45) Date of Patent: Feb. 8, 2022

(54) POLICY CONFLICT RESOLVING SYSTEM AND POLICY CONFLICT RESOLVING METHOD

(71) Applicant: Nippon Telegraph and Telephone Corporation, Tokyo (JP)

(72) Inventors: Kaori Kurita, Tokyo (JP); Hideaki Iwata, Tokyo (JP); Kazuhiro Matsuo, Tokyo (JP); Hidetaka Nishihara, Tokyo (JP); Hiroki Iwahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/968,756

(22) PCT Filed: Feb. 6, 2019

(86) PCT No.: PCT/JP2019/004239
§ 371 (c)(1),
(2) Date: Aug. 10, 2020

(87) PCT Pub. No.: WO2019/163514
PCT Pub. Date: Aug. 29, 2019

(65) Prior Publication Data
US 2020/0412616 A1    Dec. 31, 2020

(30) Foreign Application Priority Data
Feb. 23, 2018    (JP) .............................. JP2018-030789

(51) Int. Cl.
*G06F 15/173* (2006.01)
*H04L 12/24* (2006.01)

(52) U.S. Cl.
CPC ...... *H04L 41/0893* (2013.01); *H04L 41/5041* (2013.01); *H04L 41/5096* (2013.01)

(58) Field of Classification Search
CPC ............ H04L 41/0893; H04L 41/5041; H04L 41/5096
(Continued)

(56) References Cited

U.S. PATENT DOCUMENTS

| 2006/0117014 A1* | 6/2006 | Qi ..................... G06F 21/6218 |
| 2010/0105332 A1* | 4/2010 | McHenry ............. H04W 16/14 |
| | | 455/62 |

(Continued)

FOREIGN PATENT DOCUMENTS

JP    2016-149718    8/2016

OTHER PUBLICATIONS

[No Author Listed], "3GPP TS 23.203 V15.0.0—3rd Generation Partnership Protect; Technical Specification Group Services and System Aspects; Policy and charging control architecture (Release 15)," 3GPP A Global Initiative. Sep. 2017, 257 pages.

*Primary Examiner* — Quang N Nguyen
(74) *Attorney, Agent, or Firm* — Fish & Richardson P.C.

(57) ABSTRACT

A policy conflict system includes a determining unit that determines, according to an instruction for application of a second polity from a second network provider to a first network provider that performs policy control based on a set of first policies, presence or absence of a third policy conflicting with the second policy, a calculating unit that, when the determining unit determines that the third policy is present, concerning each of the second policy and the third policy, calculates priority levels different from each other referring to a storing unit storing information indicating a target that should be prioritized concerning an item relating to a policy, and an imparting unit that imparts the priority levels calculated by the calculating unit to each of the second (Continued)

policy and the third policy. Consequently, the policy conflict resolution system enables a conflict between policies to be resolved.

20 Claims, 9 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 2010/0242092 | A1* | 9/2010 | Harris | G06F 21/53 |
| | | | | 726/3 |
| 2012/0023554 | A1* | 1/2012 | Murgia | H04L 63/083 |
| | | | | 726/4 |
| 2014/0086177 | A1* | 3/2014 | Adjakple | H04L 67/10 |
| | | | | 370/329 |
| 2014/0130119 | A1* | 5/2014 | Goldschlag | H04L 63/20 |
| | | | | 726/1 |
| 2015/0178070 | A1* | 6/2015 | Doi | H04W 4/50 |
| | | | | 717/172 |
| 2015/0180963 | A1* | 6/2015 | Luecke | H04L 67/327 |
| | | | | 709/203 |
| 2016/0112460 | A1* | 4/2016 | Li | H04L 45/02 |
| | | | | 726/1 |
| 2016/0156676 | A1* | 6/2016 | Verin | H04L 65/80 |
| | | | | 709/228 |
| 2016/0255105 | A1* | 9/2016 | Palazzo | H04L 63/1416 |
| | | | | 726/23 |
| 2017/0134233 | A1* | 5/2017 | Dong | H04L 41/0893 |
| 2017/0302470 | A1* | 10/2017 | Clark | H04L 41/00 |
| 2018/0109611 | A1* | 4/2018 | Yoshida | G06F 11/00 |
| 2018/0115470 | A1* | 4/2018 | Huang | H04L 41/0873 |
| 2019/0349426 | A1* | 11/2019 | Smith | H04L 41/12 |
| 2020/0119992 | A1* | 4/2020 | Yan | H04L 41/0893 |
| 2020/0234582 | A1* | 7/2020 | Mintz | G08G 1/0968 |
| 2021/0168614 | A1* | 6/2021 | Zhang | H04W 12/106 |
| 2021/0182214 | A1* | 6/2021 | Moyer | G06F 12/0897 |

* cited by examiner

POLICY CONFLICT RESOLVING SYSTEM AND POLICY CONFLICT RESOLVING METHOD

CROSS-REFERENCE TO RELATED APPLICATIONS

This application is a National Stage application under 35 U.S.C. § 371 of International Application No. PCT/JP2019/004239, having an International Filing Date of Feb. 6, 2019, which claims priority to Japanese Application Serial No. 2018-030789, filed on Feb. 23, 2018. The disclosure of the prior application is considered part of the disclosure of this application, and is incorporated in its entirety into this application.

TECHNICAL FIELD

The present invention relates to a policy conflict resolution system and a policy conflict resolution method.

BACKGROUND ART

In a fixed network and a mobile network, policy control that can unitarily centrally manage network resources and is capable of customizing services for each of users is performed. In the policy control, a PCEF implements the policy control according to set policies.

The policies set in the PCEF include a static policy set beforehand in the PCEF and a dynamic policy dynamically set from a PCRF based on a communication opportunity or the like of a user. Priority levels can be set for the policies irrespective of the static policy or the dynamic policy. When application of a plurality of policies is simultaneously instructed and the static policy and the dynamic policy have the same priority level, basically, the dynamic policy is applied. It has been assumed that the policy control in the past is implemented by a single network provider.

On the other hand, concerning a service provided independently by the fixed network/the mobile network in the past, there have been increasing demands for a fixed-mobile cooperated service. Consequently, it is likely that application instructions for not only a policy generated by a single PCRF but also policies from PCRFs of other network providers are generated. Cooperation interfaces such as other provider cooperation in the fixed network and H-PCRF to V-PCRF cooperation in the mobile network are expected to increase in future.

Note that, concerning cooperation between the PCRF and the PCEF, an interface is specified by the 3GPP. Concerning cooperation between a BCPF and the PCEF, an interface is specified by the BBF. Further, concerning cooperation between the PCRF/BPCF and the PCEF, an interface is specified by 3GPP and the BBF.

CITATION LIST

Patent Literature

[PTL 1] Japanese Patent Application Laid-open No. 2016-149718

Non Patent Literature

[NPL 1] 3GPP TS23.203ver.15.0.0, [online], Internet <URL: http://www.3gpp.org/ftp//Specs/archive/23 series/ 23.203/2 3203-f00.zip>

SUMMARY OF THE INVENTION

Technical Problem

However, when the policy cooperation between the BPCF and the PCRF is considered, the priority levels of the policies are likely to conflict. For example, when a policy instructed from the movable network PCRF to the fixed network BPCF satisfies the following two conditions:
(1) the policy has the same priority level as a priority level of a policy defined by the fixed network BPCF, and
(2) the policy is a conflicting policy that cannot be set simultaneously with the policy defined by the fixed network BPCF, the policy is not processed at an appropriate priority level and deterioration in service quality is caused.

For example, a priority level of a conflicting policy instructed from the PCRF of the mobile network (hereinafter referred to as "mobile network policy") is the same as a priority level of a policy defined by the fixed network BPCF (hereinafter referred to as "fixed network policy"), if the mobile network policy is processed at priority lower than priority of the fixed network policy, there is concern about an increase in an execution waiting time even when the polity has high priority.

In particular, when the mobile network policy and the fixed network policy include conflicting conditions (for example, of a condition for interrupting certain communication and a condition for preferentially transferring the communication, although the former condition should be prioritized, the conditions have the same priority levels), it is likely that an appropriate service cannot be provided.

A situation in which a plurality of conflicting policies having the same priority level are present is not considered in the 3GPP and the BBF.

The present invention has been devised in view of the above points, and an object of the present invention is to enable a conflict between policies to be resolved.

Means for Solving the Problem

Therefore, in order to solve the problems, a policy conflict system includes: a determining unit that determines, according to an instruction for application of a second polity from a second network provider to a first network provider that performs policy control based on a set of first policies, presence or absence of a third policy conflicting with the second policy; a calculating unit that, when the determining unit determines that the third policy is present, concerning each of the second policy and the third policy, calculates priority levels different from each other referring to a storing unit storing information indicating a target that should be prioritized concerning an item relating to a policy; and an imparting unit that imparts the priority levels calculated by the calculating unit to each of the second policy and the third policy.

Effects of the Invention

It is possible to enable a conflict between policies to be resolved.

DESCRIPTION OF EMBODIMENTS

Figure 1:
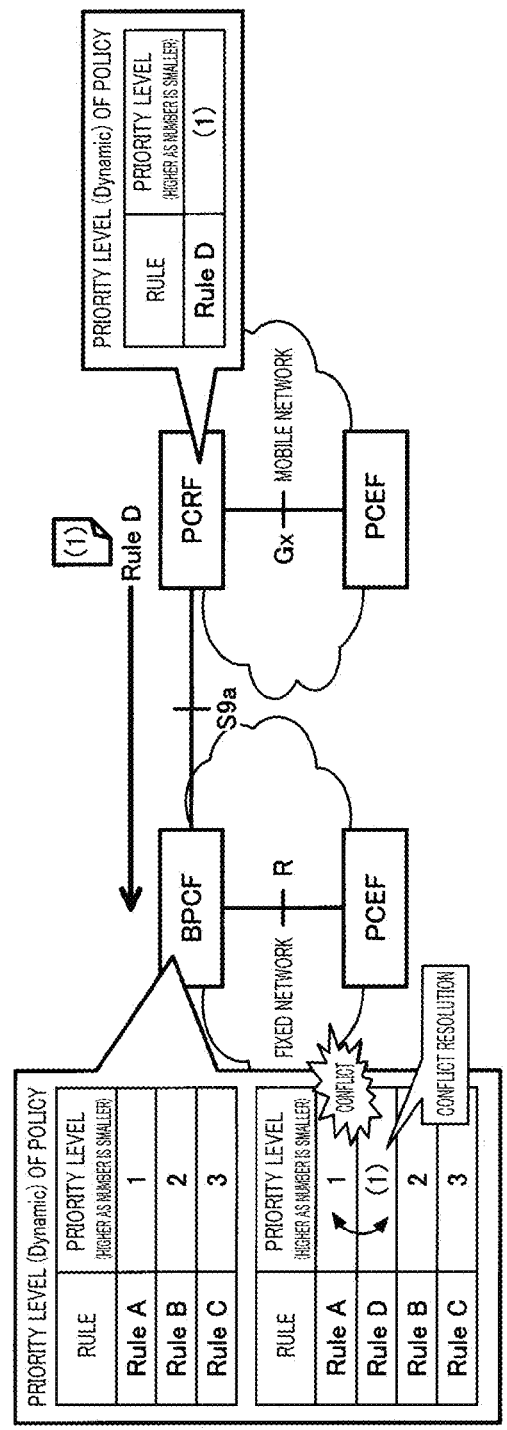
FIG. 1 is a diagram for explaining an overview of a first embodiment.

A first embodiment is explained below with reference to the drawings. FIG. 1 is a diagram for explaining an overview of the first embodiment. In FIG. 1, an example is shown in which application of a policy (Rule D) from a PCRF of a mobile network of a certain network provider, which performs policy control based on a set of certain policies, to a PCEF of a fixed network of another network provider is instructed to a BPCF of the fixed network.

In this case, when the policy (Rule D) relating to the instruction for the application has a priority level coinciding with a priority level of any policy retained by the BPCF and includes a condition conflicting with a condition of the policy, a policy conflict resolution system 10 detects a conflict between the policies and resolves the detected conflict.

Note that, in FIG. 1, an example is shown in which application of a policy is instructed from the PCRF to the BPCF. However, the same processing may be executed when an application of a policy is instructed from a BCRF to an RPCF. The policy conflict resolution system 10 is disposed in one or more computers configuring, for example, the BPCF and the PCRF.

Figure 2:
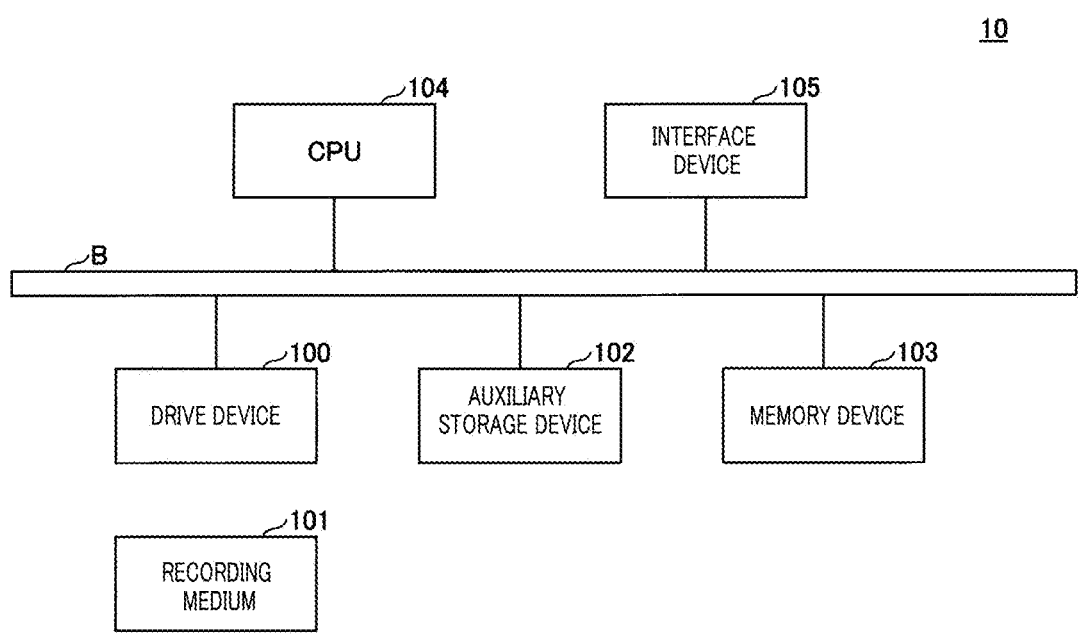
FIG. 2 is a diagram showing a hardware configuration example of a policy conflict resolution system 10 in the first embodiment.

FIG. 2 is a diagram showing a hardware configuration example of the policy conflict resolution system 10 in the first embodiment. The policy conflict resolution system 10 shown in FIG. 2 includes a drive device 100, an auxiliary storage device 102, a memory device 103, a CPU 104, and an interface device 105 connected to one another by a bus B.

A program for realizing processing in the policy conflict resolution system 10 is provided by a recording medium 101 such as a CD-ROM. When the recording medium 101 storing the program is set in the drive device 100, the program is installed in the auxiliary storage device 102 from the recording medium 101 via the drive device 100. However, the install of the program does not always need to be performed from the recording medium 101. The program may be downloaded from another computer via a network. The auxiliary storage device 102 stores the installed program and stores necessary files, data, and the like.

When a start instruction for the program is received, the memory device 103 reads out the program from the auxiliary storage device 102 and stores the program. The CPU 104 executes a function relating to the policy conflict resolution system 10 according to the program stored in the memory device 103. The interface device 105 is used as an interface for connection to the network.

Note that the hardware configuration shown in FIG. 2 may be included in a BPCF or a PCRF at a disposition destination of the policy conflict resolution system 10.

Figure 3:
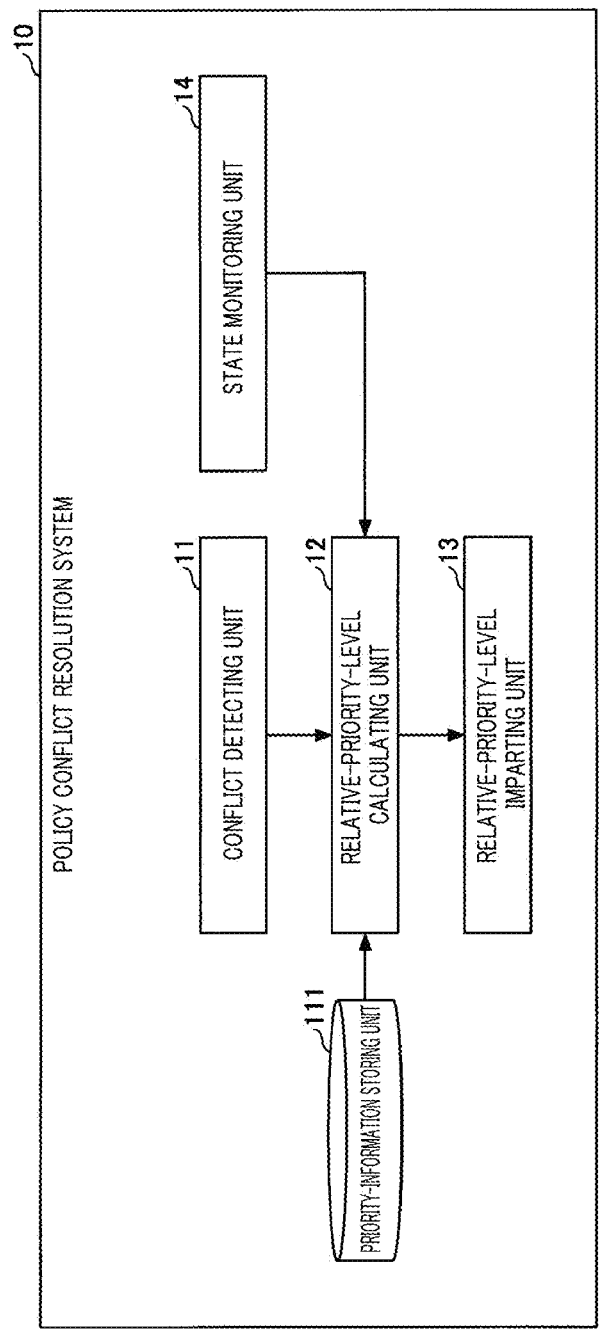
FIG. 3 is a diagram showing a functional configuration example of the policy conflict resolution system 10 in the first embodiment.

FIG. 3 is a diagram showing a functional configuration example of the policy conflict resolution system 10 in the first embodiment. In FIG. 3, the policy conflict resolution system 10 includes a conflict detecting unit 11, a relative-priority-level calculating unit 12, a relative-priority-level imparting unit 13, and a state monitoring unit 14. These units are realized by processing that one or more programs installed in the policy conflict resolution system 10 causes the CPU 104 to execute. The policy conflict resolution system 10 uses a priority-information storing unit 111. The priority-information storing unit 111 can be realized using, for example, the auxiliary storage device 102 or a storage device connectable to the policy conflict resolution system 10 via the network.

The conflict detecting unit 11 determines presence or absence of a conflict between any policy in an own network provider (hereinafter referred to as "own policy") and a policy, application of which is instructed from another network provider, (hereinafter referred to as "another policy"). In this embodiment, a conflict between policies means a state in which a plurality of policies satisfying all of (1) to (5) described below are present. The conflict between policies means a state in which a plurality of policies that cannot be simultaneously applied are present.

(1) Application periods overlap. An application period means a period in which a policy is applied. The application period is set as a start period and an end period of application or only the start period of the application. Overlap of application periods means that at least parts of application periods overlap between policies to be compared.

(2) Control conditions overlap. A control condition means, for example, an excess over a threshold of a communication amount in this month. Overlap of control conditions means that overlapping control conditions are present between policies to be compared.

(3) Control targets overlap. A control target means identification information concerning a user such as an application destination IP address and IMSI information. Overlap of control targets means that polities to be compared include the same control target.

(4) Control contents conflict (are exclusive). That is, a product set of control contents of policies is an empty set. For example, when control content of a policy A is R(A) and control content of a policy B is R(B), the control contents are in a relation of R(A) ∩R(D)=φ. Control content is, for example, band limitation, URL filtering, or the like for each of flows. Overlap of control contents means that conflicting conditions that cannot be simultaneously set are present between policies to be compared.

(5) Priority levels coincide.

Therefore, the conflict detecting unit 11 determines presence or absence of an own policy that satisfies the conditions (1) to (5) between the own policy and another policy. When the relevant own policy is present, the conflict detecting unit 11 detects a conflict between the other policy and the own policy.

When the conflict between the policies is detected by the conflict detecting unit 11, the relative-priority-level calculating unit 12 calculates, concerning the policies relating to the conflict (the other policy and one or more own policies), a priority level for determining a policy that should be relatively prioritized (hereinafter referred to as "relative priority level"). The priority-information storing unit 111 is referred to in the calculation of the relative priority level.

Information indicating a target that should be prioritized concerning a matter relating to a policy (hereinafter referred to as "priority information") is stored in the priority-information storing unit 111. As the priority information, there are a priority application source, a priority application destination, own NW provider selection, a priority application, a priority request band, a priority state, and the like. However, not all of these kinds of priority information may be used or any one or a combination of two or more of these kinds of priority information may be used.

The priority application source is information indicating a network provider that should be prioritized such as a premium service provider.

The priority application destination is information indicating an application destination that should be prioritized such as an application destination IP address (an IP address of a user terminal).

The own NW provider selection is information indicating whether any policy relating to a conflict is selected as a policy, a priority level of which should be increased by the own network provider. Such selection may be dynamically performed by an operator or the like.

The priority application is identification information of an application that should be prioritized, for example, the highest priority is given to a telephone call.

The priority request band is information indicating a request band that should be prioritized, for example, 1 Mbps or less is prioritized. Note that the request band is information forming a part of a policy.

The priority state is information indicating a state that should be prioritized among states (unexecuted, under execution, finished) of a policy.

The relative-priority-level imparting unit 13 imparts, to conflicting policies, relative priority levels calculated for the policies as priority levels of the policies. That is, the priority levels of the policies are changed according to the relative priority levels. Thereafter, application of the policy is performed according to the priority level after the change.

The state monitoring unit 14 monitors states (unexecuted, under execution, and finished) of policies.

Figure 4:
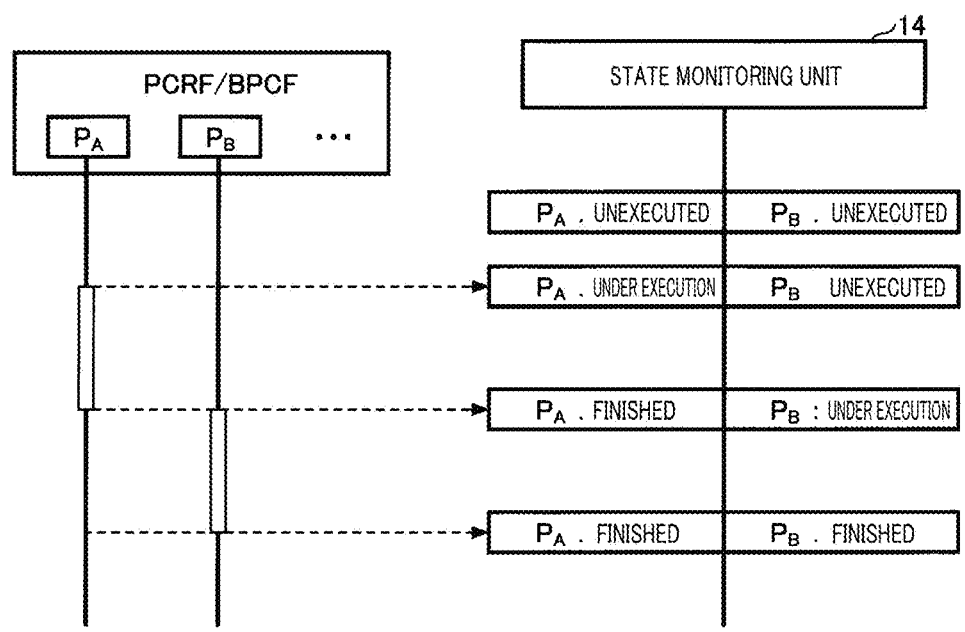
FIG. 4 is a diagram for explaining monitoring of states of policies by a state monitoring unit 14.

FIG. 4 is a diagram for explaining monitoring of states of policies by the state monitoring unit 14. As shown in FIG. 4, the state monitoring unit 14 retains, according to a change of states of policies (in FIG. 4, a policy $P_A$ and a policy $P_B$), states after the change. Note that "Unexecuted" means a state in which application has not been performed at all. "Finished" means a state in which application has been performed once or more but is not being performed at the present point in time. "Under execution" means a state in which application is being performed.

Figure 5:
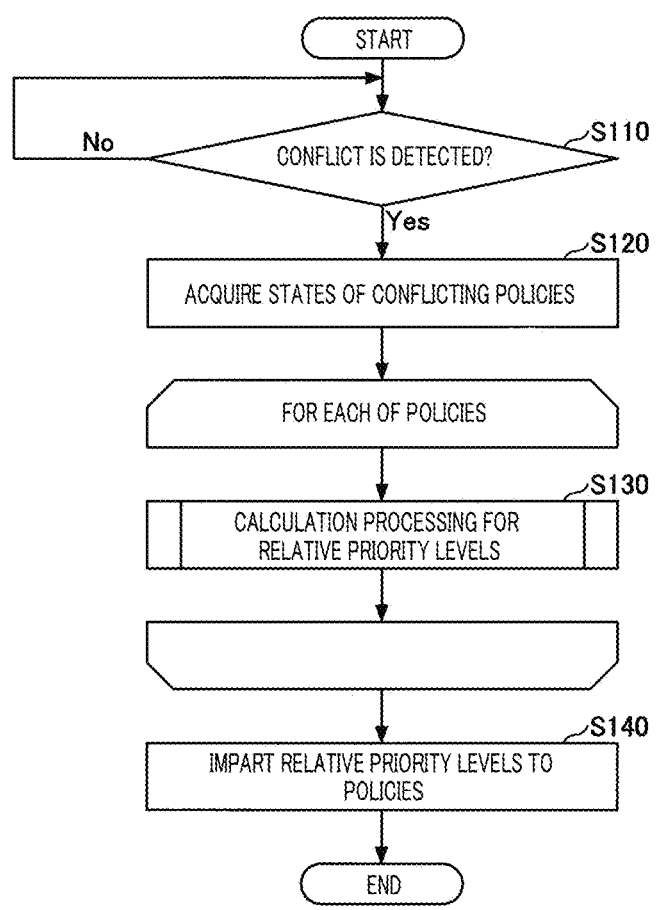
FIG. 5 is a flowchart for explaining an example of a processing procedure executed by the policy conflict resolution system 10 in the first embodiment.

A processing procedure executed by the policy conflict resolution system 10 is explained below. FIG. 5 is a flowchart for explaining an example of a processing procedure executed by the policy conflict resolution system 10 in the first embodiment.

If application of another policy is instructed and presence of an own policy conflicting with the other policy is detected by the conflict detecting unit 11 (Yes in S110), the relative-priority-level calculating unit 12 acquires states of the conflicting policies (the other policy and one or more own policies) from the state monitoring unit 14 (S120).

Subsequently, the relative-priority-level calculating unit 12 executes, concerning the policies, calculation processing for relative priority levels (S130). As a result, relative priority levels of the policies are calculated. Subsequently, the relative-priority-level imparting unit 13 imparts the calculated relative priority levels to each of the policies as priority levels (S140). That is, the priority levels of the policies are changed. As a result, it is possible to increase likelihood that a difference occurs among the priority levels of the policies. That is, it is possible to increase likelihood that the conflict between the policies can be resolved.

Figure 6:
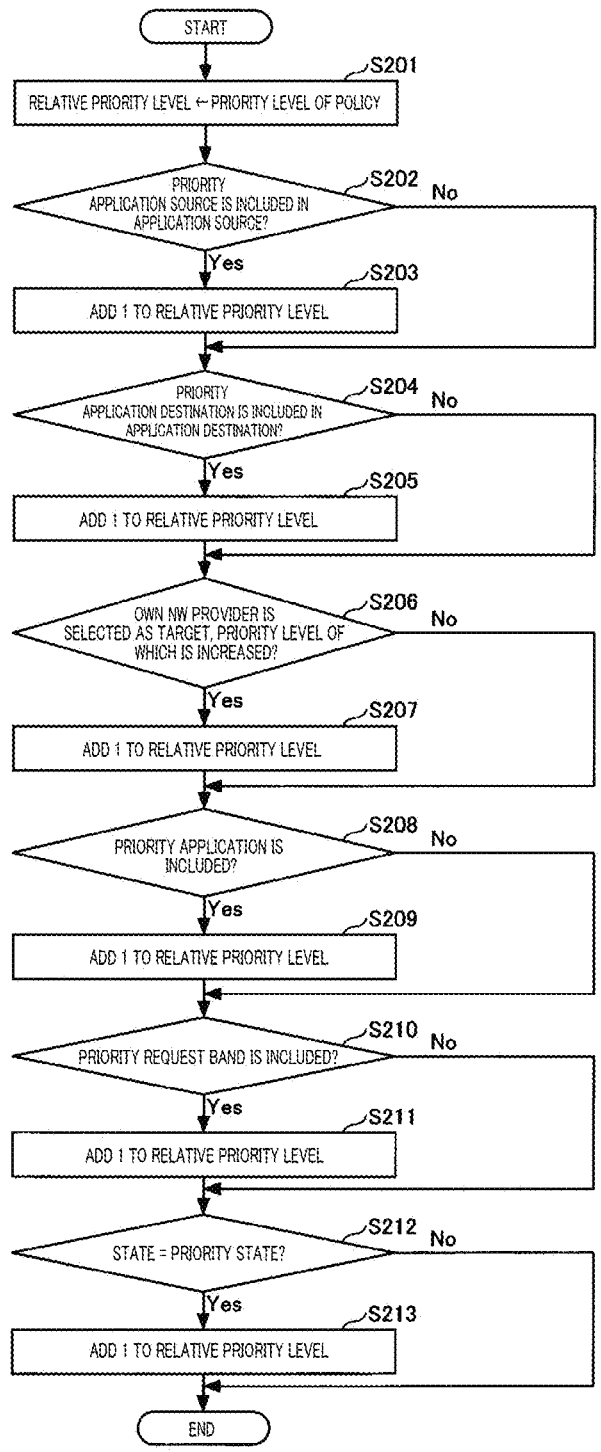
FIG. 6 is a flowchart for explaining an example of a processing procedure of calculation processing for relative priority levels.

Subsequently, details of step S130 are explained. FIG. 6 is a flowchart for explaining an example of a processing procedure of calculation processing for relative priority levels. A policy set as a processing target in FIG. 6 is referred to as "target policy".

In step S201, the relative-priority-level calculating unit 12 substitutes a priority level of the target policy in a relative priority level of the target policy (hereinafter referred to as "target priority level").

Subsequently, the relative-priority-level calculating unit 12 determines whether a priority application source is included in an application source of the target policy (S202). Note that which application source is the priority application source is stored in the priority-information storing unit 111. When the priority application source is included in the application source of the target policy (Yes in S202), the relative-priority-level calculating unit 12 adds 1 to the target priority level (S203).

Subsequently, the relative-priority-level calculating unit 12 determines whether a priority application destination is included in an application destination of the target policy (S204). Note that which application destination is the priority application destination is stored in the priority-information storing unit 111. When the priority application destination is included in the application destination of the target policy (Yes in S204), the relative-priority-level calculating unit 12 adds 1 to the target priority level (S205).

Subsequently, the relative-priority-level calculating unit 12 determines whether the target policy is selected as a policy, a priority level of which should be increased by the own network provider (S206). A result of such selection (for example, a list of selected policies) may be stored in the priority-information storing unit 111. When the target policy is selected as a policy, a priority level of which should be increased by the own network provider (Yes in S206), the relative-priority-level calculating unit 12 adds 1 to the target priority level (S207).

Subsequently, the relative-priority-level calculating unit 12 determines whether a priority application is included in the target policy (S208). Note that which application is the priority application is stored in the priority-information storing unit 111. When the priority application is included in the target policy (Yes in S208), the relative-priority-level calculating unit 12 adds 1 to the target priority level (S209).

Subsequently, the relative-priority-level calculating unit 12 determines whether a priority request band is included in the target policy (S210). Note that which request band is the priority request band is stored in the priority-information storing unit 111. When the priority request band is included in the target policy (Yes in S210), the relative-priority-level calculating unit 12 adds 1 to the target priority level (S211).

Subsequently, the relative-priority-level calculating unit 12 determines whether a state of the target policy is a priority state (S212). Note that which state is the priority state is stored in the priority-information storing unit 111. When the state of the target policy coincides with the priority state (Yes in S212), the relative-priority-level calculating unit 12 adds 1 to the target priority level (S213).

Note that, in the above description, an example is explained in which weights for the kinds of priority information are the same (addition values to the relative priority levels are the same). However, the weights may be changed according to the priority information. For example, 2 may be added when the priority application destination is included (Yes in S202). Alternatively, when relative priority levels are the same between conflicting policies, weights may be changed to recalculate relative priority levels.

One of the priority information may be whether an increase of a priority level is instructed by the user. For example, when the user instructs an increase of the priority level via a GUI (Graphical User Interface) or the like during service use, the own network provider may perform addition to a relative priority level of a policy applied to the user.

As explained above, according to the first embodiment, even when application of conflicting policies is instructed to one terminal, relative priority levels are calculated concerning the conflicting policies. A difference can be generated in priority levels based on the relative priority levels. Therefore, it is possible to increase likelihood that the conflict between the policies is resolved. As a result, it is possible to perform policy control at priority levels optimum for services. It is possible to prevent a forced end of service provision involved in the policy conflict. Further, it is possible to contribute to efficient allocation of resources.

A second embodiment is explained. In the second embodiment, differences from the first embodiment are explained. Points not particularly referred to in the second embodiment may be the same as the points in the first embodiment.

Figure 7:
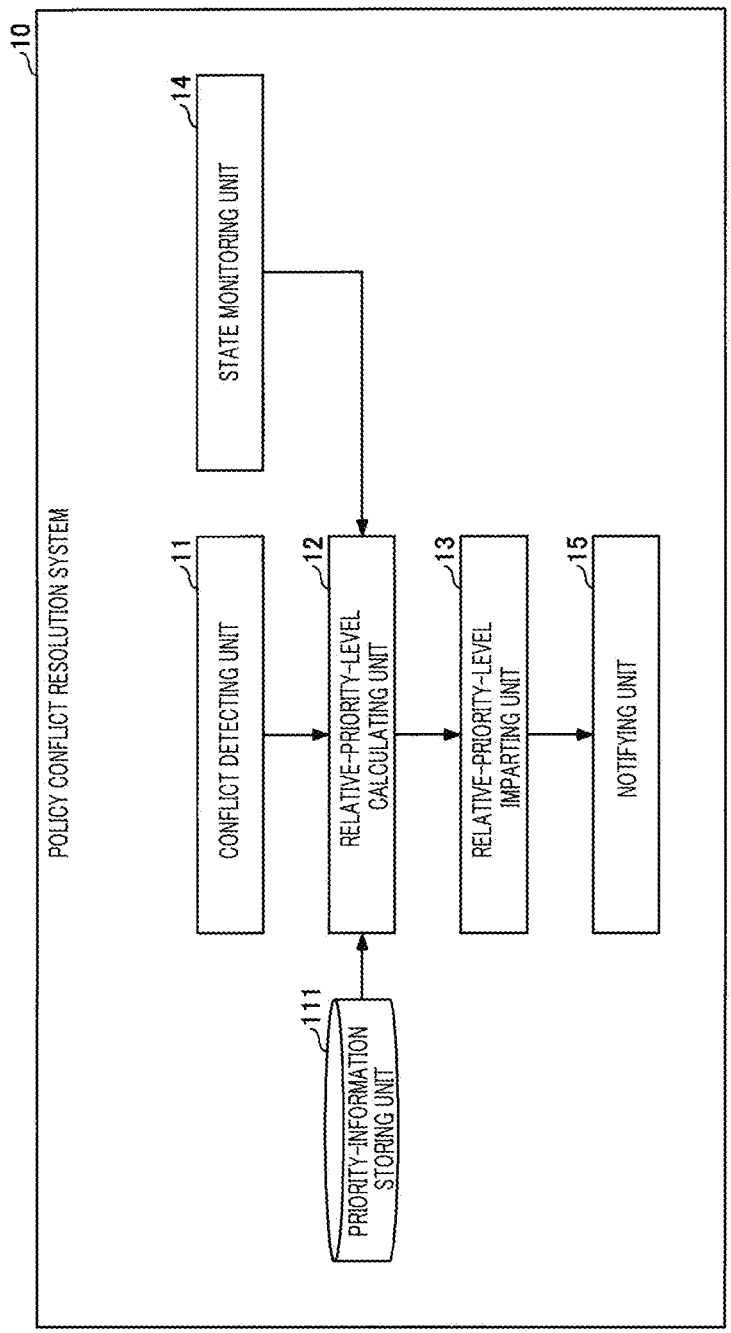
FIG. 7 is a diagram showing a functional configuration example of the policy conflict resolution system 10 in a second embodiment.

FIG. 7 is a diagram showing a functional configuration example of the policy conflict resolution system 10 in the second embodiment. In FIG. 7, the same portions as the portions shown in FIG. 3 are denoted by the same reference numerals and signs. Explanation of the portions is omitted. In FIG. 7, the policy conflict resolution system 10 further includes a notifying unit 15. The notifying unit 15 notifies a conflict between policies and a change of priority levels of the policies to network providers, which are application sources of the policies relating to the conflict.

Figure 8:
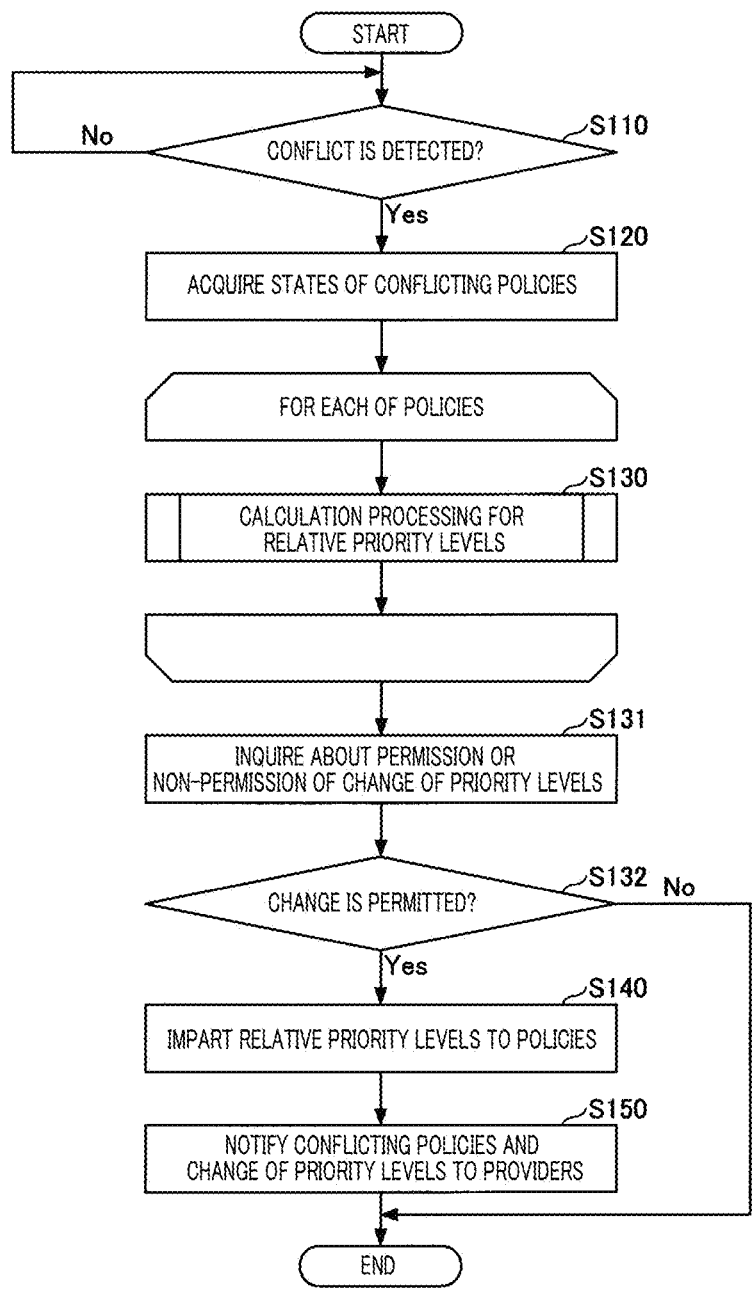
FIG. 8 is a flowchart for explaining an example of a processing procedure executed by the policy conflict resolution system 10 in the second embodiment.

FIG. 8 is a flowchart for explaining an example of a processing procedure executed by the policy conflict resolution system 10 in the second embodiment. In FIG. 8, the same steps as the steps in FIG. 6 are denoted by the same step numbers. Explanation of the steps is omitted. In FIG. 8, steps S131 and S132 are added before step S140. Step S150 is added after step S140.

In step S131, the relative-priority-level imparting unit 13 inquires (asks) an own network provider (an application source of an own policy conflicting with another policy) about permission or non-permission of a change of priority levels (that is, permission or non-permission of resolution of the conflict between the policies). For example, a message indicating such inquiry and relative priority levels of the conflicting policies may be output to a terminal of an administrator or the like of the own network provider.

An operator or the like who refers to the inquiry (the query) compares the relative priority levels of the conflicting policies and confirms which of the policies is prioritized. Then, the operator or the like can determine permission or non-permission of the change of the priority levels.

When permission of the change of the priority levels is input (Yes in S132), step S150 is executed following step S140.

In step S150, the notifying unit 15 transmits notification information indicating the detection of the conflict between the policies and the change of the priority levels of the policies to terminals of administrators or the like of network providers, which are application sources of the policies relating to the conflict. Content of the conflicting policies, priority levels after the change, and the like may be included in the notification information. Note that contacts (for example, IP addresses of the terminals) of the administrators only have to be stored in the auxiliary storage device 102 or the like in advance.

Note that, in the second embodiment, steps S131 and S132 may not be executed. Alternatively, step S150 may not be executed. When step S150 is not executed, a functional configuration of the policy conflict resolution system 10 in the second embodiment may be as shown in FIG. 3.

Alternatively, steps S131 and S132 may be executed following step S110 (that is, following the detection of the conflict). In this case, information indicating the conflicting policies only has to be included in the inquiry. When the change of the priority levels is permitted, step S120 and subsequent steps may be executed. When the change of the priority levels is not permitted, step S120 and subsequent steps may not be executed.

Step S150 may be executed following step S110 (that is, following the detection of the conflict). In this case, the information indicating the conflicting policies only has to be included in the notification information. The priority levels after the change may not be included in the notification information.

Figure 9:
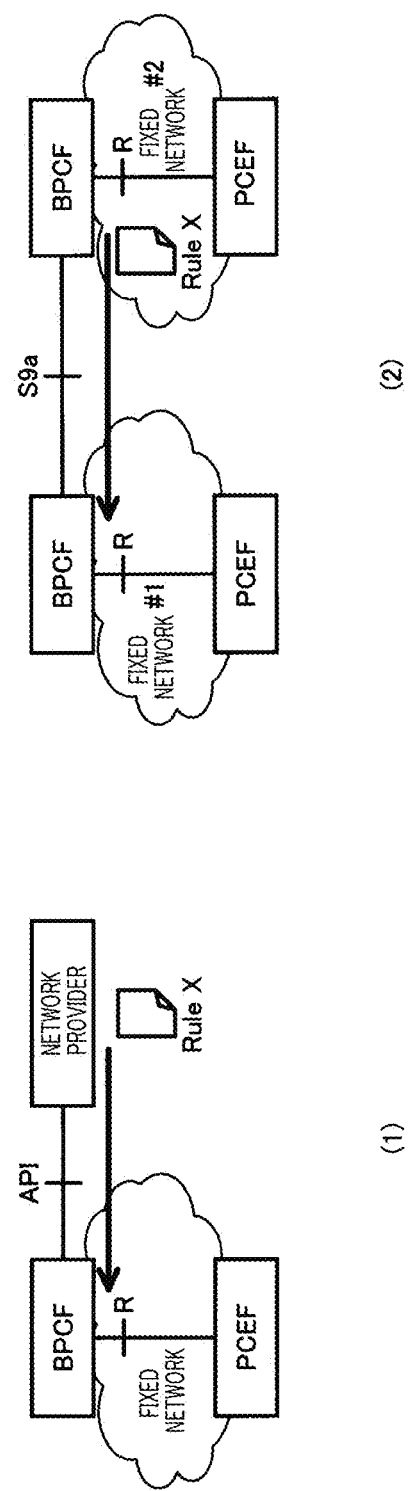
FIG. 9 is a diagram showing another configuration example to which the embodiment is applicable.

Note that the embodiments may be applied to the configuration shown in FIG. 9 other than the configuration shown in FIG. 1.

FIG. 9 is a diagram showing another configuration example to which this embodiment is applicable. (1) in FIG. 9 is a configuration in which application of a policy is instructed from another network provider through an API. (2) is a configuration in which application of a policy is instructed from a BPCF of a fixed network of a certain network provider to a BPCF of a fixed network of another network provider.

Note that, in the embodiments explained above, the conflict detecting unit 11 is an example of the determining unit. The relative-priority-level calculating unit 12 is an example of the calculating unit. The relative-priority-level imparting unit 13 is an example of the imparting unit and the inquiring unit.

The embodiments of the present invention are explained detail above. However, the present invention is not limited to such specific embodiments. Various modifications and changes are possible within the scope of the gist of the present invention described in claims.

REFERENCE SIGNS LIST

10 Policy conflict resolution system
11 Conflict detecting unit
12 Relative-priority-level calculating unit
13 Relative-priority-level imparting unit
14 State monitoring unit
15 Notifying unit
100 Drive device
101 Recording medium
102 Auxiliary storage device
103 Memory device
104 CPU
105 Interface device
111 Priority-information storing unit
B Bus

The invention claimed is:

1. A policy conflict resolving system comprising:
a determining unit, including one or more computers, configured to determine, according to an instruction for application of a second policy from a second network provider to a first network provider that performs policy control based on a set of first policies, presence or absence of a third policy that cannot be set simultaneously with the second policy, wherein the second policy and the third policy have a same priority levels;
a calculating unit, including the one or more computers, configured to, based on the determining unit having determined that the third policy is present and for each of the second policy and the third policy, calculate priority levels different from each other referring to a storing unit storing information indicating a target that should be prioritized concerning an item relating to a policy; and
an imparting unit, including the one or more computers, configured to impart the priority levels calculated by the calculating unit to each of the second policy and the third policy, wherein imparting the priority levels includes changing the priority level of at least one of the second policy or the third policy so that the priority level of the second policy differs from the priority level of the third policy.

2. The policy conflict resolving system according to claim 1, wherein:
the information indicating the target that should be prioritized is at least one of (i) information indicating an application source that should be prioritized, (ii) information indicating an application destination that should be prioritized, (iii) information indicating an application that should be prioritized, (iv) information indicating a request band that should be prioritized, or (v) information indicating a state that should be prioritized concerning a state of application of a policy.

3. The policy conflict resolving system according to claim 2, wherein calculating the priority levels comprises:
assigning, to the policy for which the priority level is calculated, weight for each of (i) an application source, (ii) an application destination, (iii) an application, (iv) a request band, or (v) a state of the policy included in the information indicating the target,
wherein the priority level of the policy correlates to the assigned weights.

4. The policy conflict resolving system according to claim 3, wherein different weights are assigned for each of (i) an application source, (ii) an application destination, (iii) an application, (iv) a request band, and (v) a state of the policy included in the information indicating the target.

5. The policy conflict resolving system according to claim 3, wherein, based on the calculated priority levels of the second policy and the third policy being equal, the calculating unit is further configured to reassign different weights for each of (i) an application source, (ii) an application destination, (iii) an application, (iv) a request band, and (v) a state of the policy included in the information indicating the target to differentiate the priority level of the second policy and the priority level of the third policy.

6. The policy conflict resolving system according to claim 1, further comprising:
a notifying unit, including one or more computers, configured to notify, based on the determining unit having determined that the third policy is present, a conflict between the second policy and the third policy to application sources of the second policy and the third policy.

7. The policy conflict resolving system according to claim 1, further comprising:
an inquiring unit, including one or more computers, configured to inquiry, based on the determining unit having determined that the third policy is present, an application source of the second policy about permission or non-permission of a change of the priority levels of the second policy and the third policy,
wherein, based on the change being permitted, the imparting unit is configured to impart the priority levels calculated by the calculating unit to each of the second policy and the third policy.

8. The policy conflict resolving system according to claim 7, wherein inquiring about permission or non-permission of a change of the priority levels further comprises transmitting, to the application source of the second policy, a message indicating the inquiry and the calculated priority levels of the second policy and the third policy.

9. The policy conflict resolving system according to claim 8, wherein the application source of the second policy is configured to, in response to the inquiry, compare the calculated priority levels of the second policy and the third policy to determine which of the second policy or the third policy is prioritized.

10. The policy conflict resolving system according to claim 9, wherein the application source of the second policy is further configured to, based on the determination of the prioritization, determine permission or non-permission of the change of the priority levels.

11. A policy conflict resolving method, the method comprising:
determining, according to an instruction for application of a second policy from a second network provider to a first network provider that performs policy control based on a set of first policies, presence or absence of a third policy that cannot be set simultaneously with the second policy, wherein the second policy and the third policy have a same priority levels;
based on it being determined that the third policy is present and for each of the second policy and the third policy, calculating priority levels different from each other referring to a storing unit storing information indicating a target that should be prioritized concerning an item relating to a policy; and
imparting the calculated priority levels to each of the second policy and the third policy, wherein imparting the priority levels includes changing the priority level of at least one of the second policy or the third policy so that the priority level of the second policy differs from the priority level of the third policy.

12. The policy conflict resolving method according to claim 11, wherein:
the information indicating the target that should be prioritized is at least one of (i) information indicating an application source that should be prioritized, (ii) information indicating an application destination that should be prioritized, (iii) information indicating an application that should be prioritized, (iv) information indicating a request band that should be prioritized, or (v) information indicating a state that should be prioritized concerning a state of application of a policy.

13. The policy conflict resolving method according to claim 12, wherein calculating the priority levels comprises:

assigning, to the policy for which the priority level is calculated, weight for each of (i) an application source, (ii) an application destination, (iii) an application, (iv) a request band, or (v) a state of the policy included in the information indicating the target, wherein the priority level of the policy correlates to the assigned weights.

14. The policy conflict resolving method according to claim 13, wherein different weights are assigned for each of (i) an application source, (ii) an application destination, (iii) an application, (iv) a request band, and (v) a state of the policy included in the information indicating the target.

15. The policy conflict resolving method according to claim 13, wherein, based on the calculated priority levels of the second policy and the third policy being equal, calculating the priority levels further includes reassigning different weights for each of (i) an application source, (ii) an application destination, (iii) an application, (iv) a request band, and (v) a state of the policy included in the information indicating the target to differentiate the priority level of the second policy and the priority level of the third policy.

16. The policy conflict resolving method according to claim 11, further comprising:

based on it being determined that the third policy is present, notifying a conflict between the second policy and the third policy to application sources of the second policy and the third policy.

17. The policy conflict resolving method according to claim 11, further comprising:

based on it being determined that the third policy is present, inquiring an application source of the second policy about permission or non-permission of a change of the priority levels of the second policy and the third policy; and based on the change being permitted, imparting the calculated priority levels comprises imparting the calculated priority levels to each of the second policy and the third policy.

18. The policy conflict resolving method according to claim 17, wherein inquiring about permission or non-permission of a change of the priority levels further comprises transmitting, to the application source of the second policy, a message indicating the inquiry and the calculated priority levels of the second policy and the third policy.

19. The policy conflict resolving method according to claim 18, wherein the application source of the second policy is configured to, in response to the inquiry, compare the calculated priority levels of the second policy and the third policy to determine which of the second policy or the third policy is prioritized.

20. The policy conflict resolving method according to claim 19, wherein the application source of the second policy is further configured to, based on the determination of the prioritization, determine permission or non-permission of the change of the priority levels.

* * * * *